United States Patent [19]

Gallix, Remy

[11] Patent Number: 4,816,205
[45] Date of Patent: Mar. 28, 1989

[54] REMOTELY REPLACEABLE TOKAMAK PLASMA LIMITER TILES

[75] Inventor: Gallix, Remy, San Diego, Calif.

[73] Assignee: The United States Department of Energy, Washington, D.C.

[21] Appl. No.: 130,591

[22] Filed: Dec. 9, 1987

[51] Int. Cl.$^4$ ............................................... G21B 1/00
[52] U.S. Cl. ................................... 376/136; 376/150; 211/192; 248/225.2
[58] Field of Search ................... 376/136, 146, 150; 248/225.2, 225.1, 222.1; 211/208, 103, 192

[56] References Cited

U.S. PATENT DOCUMENTS

| | | | |
|---|---|---|---|
| H240 | 2/1986 | Kugel et al. | 376/136 |
| 3,106,297 | 10/1963 | Schroeder | 211/192 |
| 3,512,653 | 5/1970 | Erismann | 211/192 |
| 3,741,405 | 6/1973 | McConnell et al. | 211/192 |
| 3,979,866 | 9/1976 | Prescott . | |
| 3,980,916 | 9/1976 | Kaminsky | 376/136 |
| 4,212,445 | 7/1980 | Hagen | 248/221.1 |
| 4,289,582 | 9/1981 | Parr et al. . | |
| 4,532,101 | 7/1985 | Doll | 376/136 |
| 4,619,807 | 10/1986 | Kotzlowski . | |
| 4,654,182 | 3/1987 | D'Aoust . | |
| 4,663,108 | 5/1987 | Caristrom | 376/136 |
| 4,696,781 | 9/1987 | Bourque | 376/136 |
| 4,700,916 | 10/1987 | Bastian et al. | 211/192 |

OTHER PUBLICATIONS

9th Symp. on Eng. Problems of Fusion Research, Chicago, Ill., Oct., 1981, Paper 5E-04, Winkler et al., pp. 1383–1388.
9th Symp. on Eng. Problems of Fusion Research, Chicago, Ill., Oct., 1981, McKelvey et al., pp. 1650–1653.
Nuclear Technology/Fusion, vol. 4, Sep. 1983, pp. 202–207, Stacy et al.

Primary Examiner—Harvey E. Behrend
Attorney, Agent, or Firm—Clifton E. Clouse, Jr.; Roger S. Gaither; Judson R. Hightower

[57] ABSTRACT

U-shaped limiter tiles placed end-to-end over a pair of parallel runners secured to a wall have two rods which engage L-shaped slots in the runners. The short receiving legs of the L-shaped slots are perpendicular to the wall and open away from the wall, while long retaining legs are parallel to and adjacent the wall. A sliding bar between the runners has grooves with clips to retain the rods pressed into receiving legs of the L-shaped slots in the runners. Sliding the bar in the direction of retaining legs of the L-shaped slots latches the tiles in place over the runners. Resilient contact strips between the parallel arms of the U-shaped tiles and the wall assure thermal and electrical contact with the wall.

10 Claims, 5 Drawing Sheets

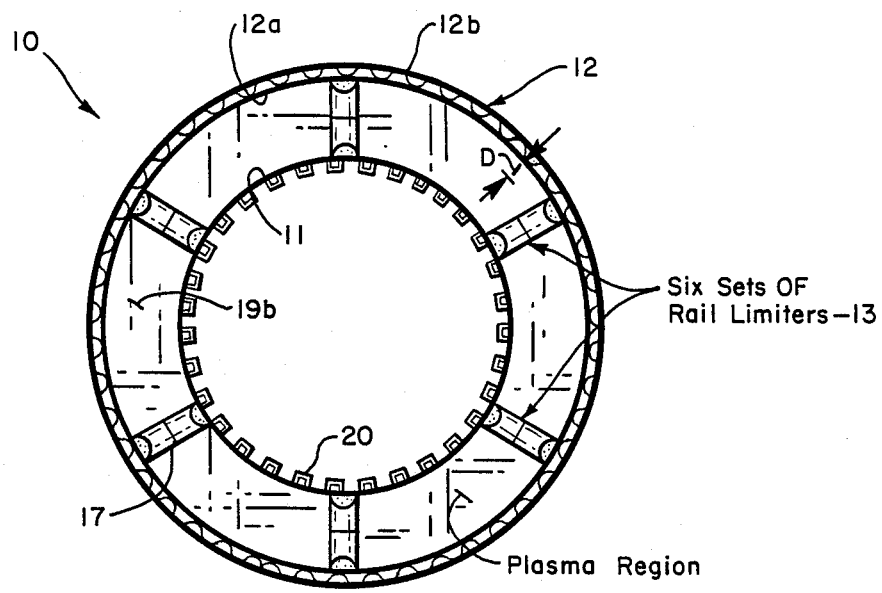
FIG. 1
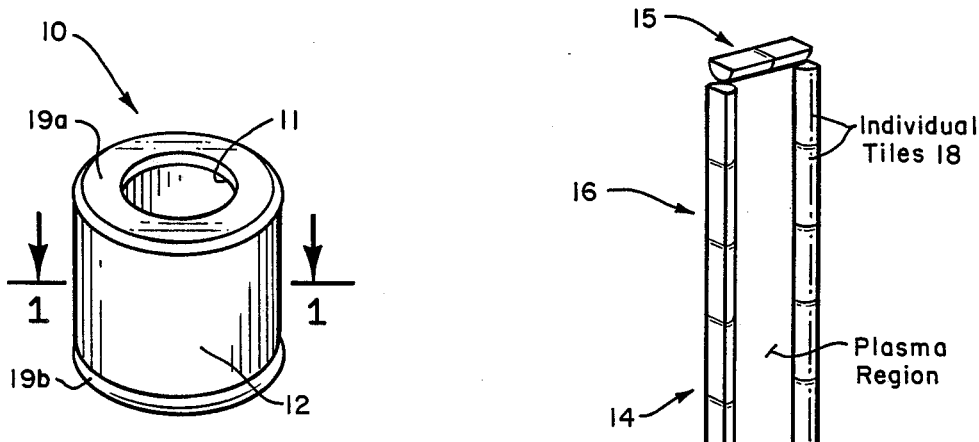
FIG. 1a
FIG. 2

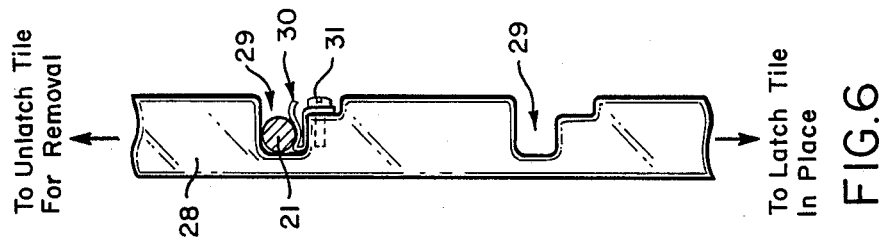
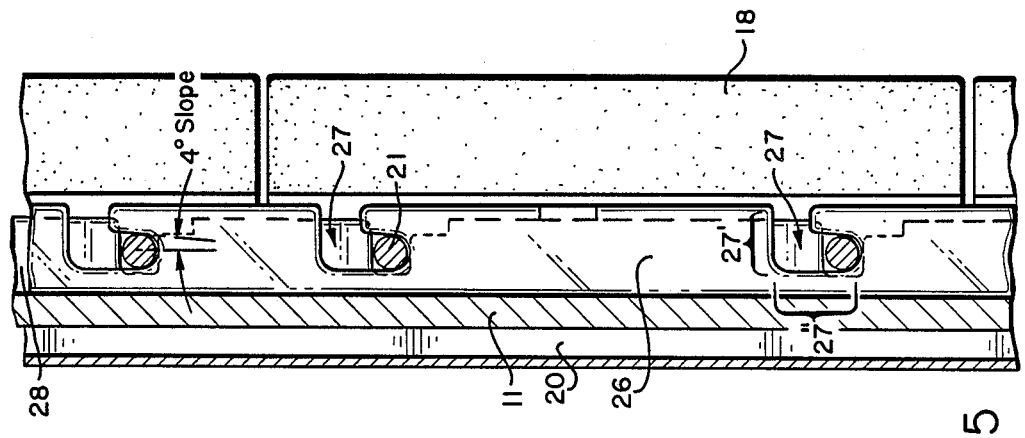
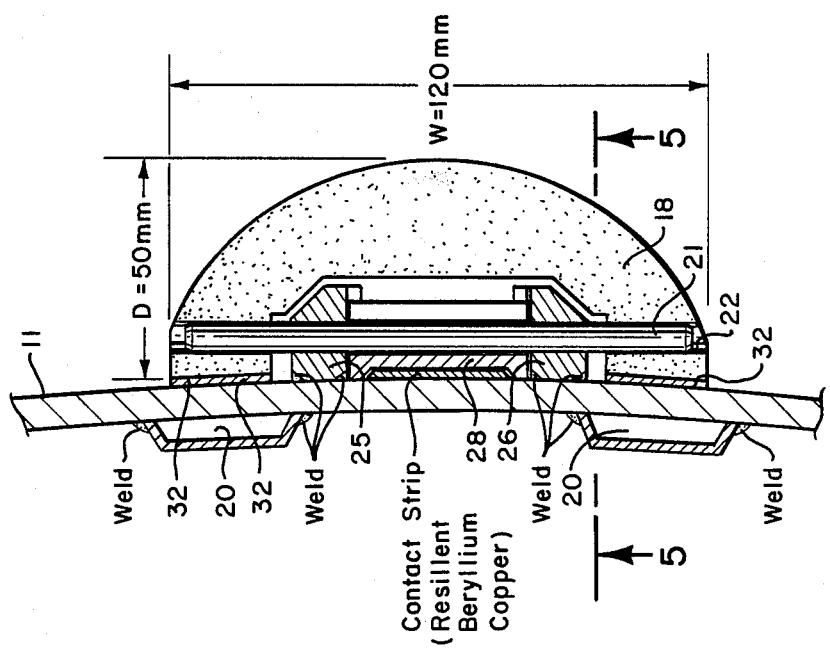

REMOTELY REPLACEABLE TOKAMAK PLASMA LIMITER TILES

BACKGROUND OF THE INVENTION

The invention described herein arose in the course of, or under, Contract No. DE-AC03-84ER53158 between the United States Department of Energy and GA Technologies, Inc.

This invention relates generally to high-energy plasma devices, and more specifically to a means of so attaching a row of limiter tiles to the wall of a plasma chamber that they may be individually replaced by a suitable remote handling tool.

Plasma devices, such as Ignition Tokamak devices, require that the walls of the chamber containing the plasma be protected from damage by contact of the very hot plasma with the walls, while the plasma itself needs to be protected from any contamination that may be produced by contact with the walls. It has been proposed, as described in U.S. Pat. No. 4,654,182, issued Mar. 31, 1987, to J. R. D'Aoust, to use spaced rings of carbon tiles on the inside of the plasma chamber to cause the plasma to contact only the carbon tiles, thus reducing the heat load on the walls of the plasma chamber while at the same time obviating metal contamination of the plasma.

It also has been proposed to detachably connect limiter tiles to a wall of a plasma vacuum vessel. See, for example, U.S. Pat. No. 4,619,807, issued Oct. 28th, 1986, to H. E. Kotzlowski, which discloses the use of limiter members as a heat shield for high thermal loading, and particularly for pulsed heat loading in fusion reactors. The limiter members are detachably connected to a support plate.

SUMMARY OF THE INVENTION

An object of the present invention is to provide a system for efficient installation and replacement of one or more discrete elements on a supporting surface.

Another object is to provide an efficient yet reliable mechanism for permitting installation and removal of one or more limiter tiles in a row in a plasma chamber.

Still another object is to provide an attachment system for limiter tiles which presses the tiles into thermal contact with the wall of the plasma chamber for improving thermal conduction and better cooling through channels on the other side of the wall.

These and other objects of the invention are achieved by providing an annular plasma chamber with one or more limiters formed of a plurality of tiles disposed end-to-end to form a ring on the inside walls using an attachment system for releasably retaining the tiles on the walls. The attachment system comprises a pair of runners projecting from a chamber wall and arranged to define at least one segment of the limiter ring. The runners are provided with spaced L-shaped slots to receive the tiles positioned end-to-end, at least one pair of slots for each tile to be retained end-to-end in a rectilinear segment. The tiles are each U-shaped in cross section throughout their length, and at least one transverse elongated element, such as a rod, is mounted in bores through parallel arms of the tile to be retained so as to engage the L-shaped slots of the runners. The rod is latched in the pair of slots by a securing system comprising a sliding bar having a groove formed therein to receive the rod and forcing the rod into retaining legs of the associated pair of slots by a sliding movement of the bar.

A sloped surface is preferably provided in the retaining leg of each slot for forcing the rod of the tile being attached to be tight against the wall of the plasma chamber as the rod is forced along the sloped surface of the retaining leg. Thermal and electrical contact of the tiles with the supporting wall is enhanced by insertion of resilient conductive strips between the back sides of the tiles and the wall. Resilient strips of beryllium copper have been found satisfactory for this purpose.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 1 is a cross section at midplane looking toward an end of an annular vacuum vessel defining a plasma chamber having six sets of rail limiters between inner and outer vessel walls. FIG. 1a illustrates in perspective the annular plasma vacuum vessel of FIG. 1.

FIG. 2 is a perspective view showing one set of rail limiters as used in the vacuum vessel of FIG. 1.

FIG. 4 is a fragmentary, cross-sectional view taken generally along the line 4—4 of FIG. 3.

FIG. 5 is an enlarged, fragmentary, cross-sectional view taken generally along the line 5—5 of FIG. 4.

FIG. 6 is an enlarged, fragmentary, side-elevational view showing a detail of the attachment system of FIGS. 3 through 5.

DESCRIPTION OF THE PREFERRED EMBODIMENTS

Figure 3A:
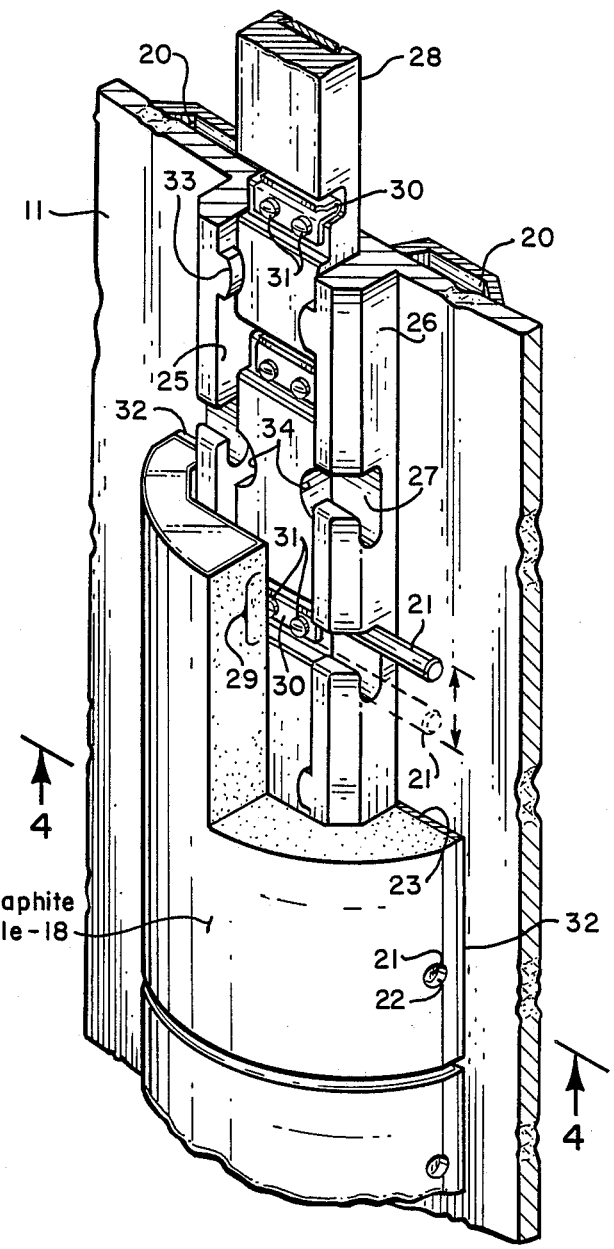
FIG. 3a is a fragmentary, perspective view, partially cut away and in section, showing a preferred rail limiter tile and attachment system according to the present invention.

Referring to FIG. 1, an annular plasma chamber 10 having an inner wall 11 and an outer wall 12 is protected from contact with a plasma in a region between the walls by, for example, six sets of rail limiters 13 in the form, shown in FIG. 2, of four straight subsets of rail limiters 14, 15, 16 and 17. Each set of rail limiters surrounds the plasma region in a rectangular frame when thus arranged on the walls of the chamber 10.

The plasma chamber in this preferred embodiment has a rectangular cross section because its inner and outer walls are hollow cylinders, as shown in FIG. 1a. But the chamber may have other cross sections, such as circular or D-shape, for example. The sets of rail limiters would then be arranged in a circular or D shape.

The rail limiters 14, 15, 16 and 17 are made up of a plurality of individual tiles 18, such as eight shown in FIG. 2 for a subset of tiles that are arranged end-to-end on the inner wall 11, or other wall 12. The rail limiters on the end walls 19a and 19b are made up of fewer tiles, for example, the two shown in FIG. 2. The total distance D, or build of each limiter shown in FIG. 1 can be, for example, about 50 mm for a rail limiter 120 mm wide and 160 mm long. The chamber walls (sides and ends) receive about 50% of the heat load; the rail limiters receive the rest of the heat load.

As the plasma moves circularly in the chamber under the influence of electromagnetic forces (not shown), it passes through one rail limiter after another. As it leaves one set, it will tend to expand, but not at a sufficient rate to impinge the walls before reaching the next set of rail limiters. There the plasma that might otherwise tend to reach the walls will strike the limiters. Cooling channels 20 are spaced around the inside of the inner wall 11. Cooling channels for the outer wall are provided by implementing the outer wall with two concentric hollow cylinders 12a and 12b with spacers between them in an arrangement analogous to the manner in which corrugated cardboard is made.

The tiles 18 are preferably constructed from graphite, or other suitable material providing a low atomic number contact surface to a plasma contained in the chamber 10. Graphite is preferred because it is also quite resistant to thermal shock and high temperature.

In accordance with the present invention, the limiter tiles 18 are attached to a wall by a quick-disconnect system 20 illustrated in FIGS. 3 through 6 for attachment to a wall, such as the inner wall 11. The only difference between the parts of the quick-disconnect system for the outer wall 12, or an end wall, is simply conforming the parts for an interface with a convex or flat wall instead of concave wall.

Figure 3B:
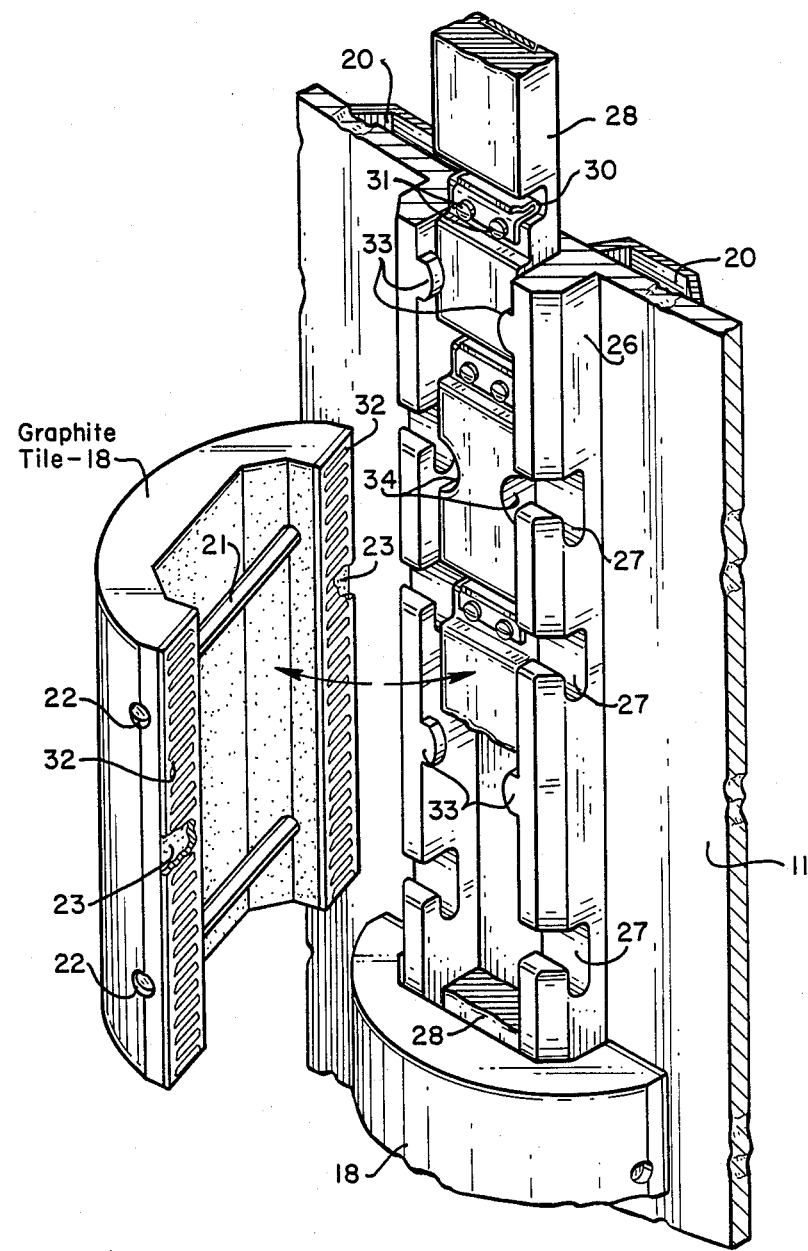
FIG. 3b is a partially exploded view of FIG. 3a, and FIG. 3c illustrates schematically a simple manipulator for removing and replacing a rail limiter tile from a wall once the tiles in a row are unlatched.
Figure 3C:
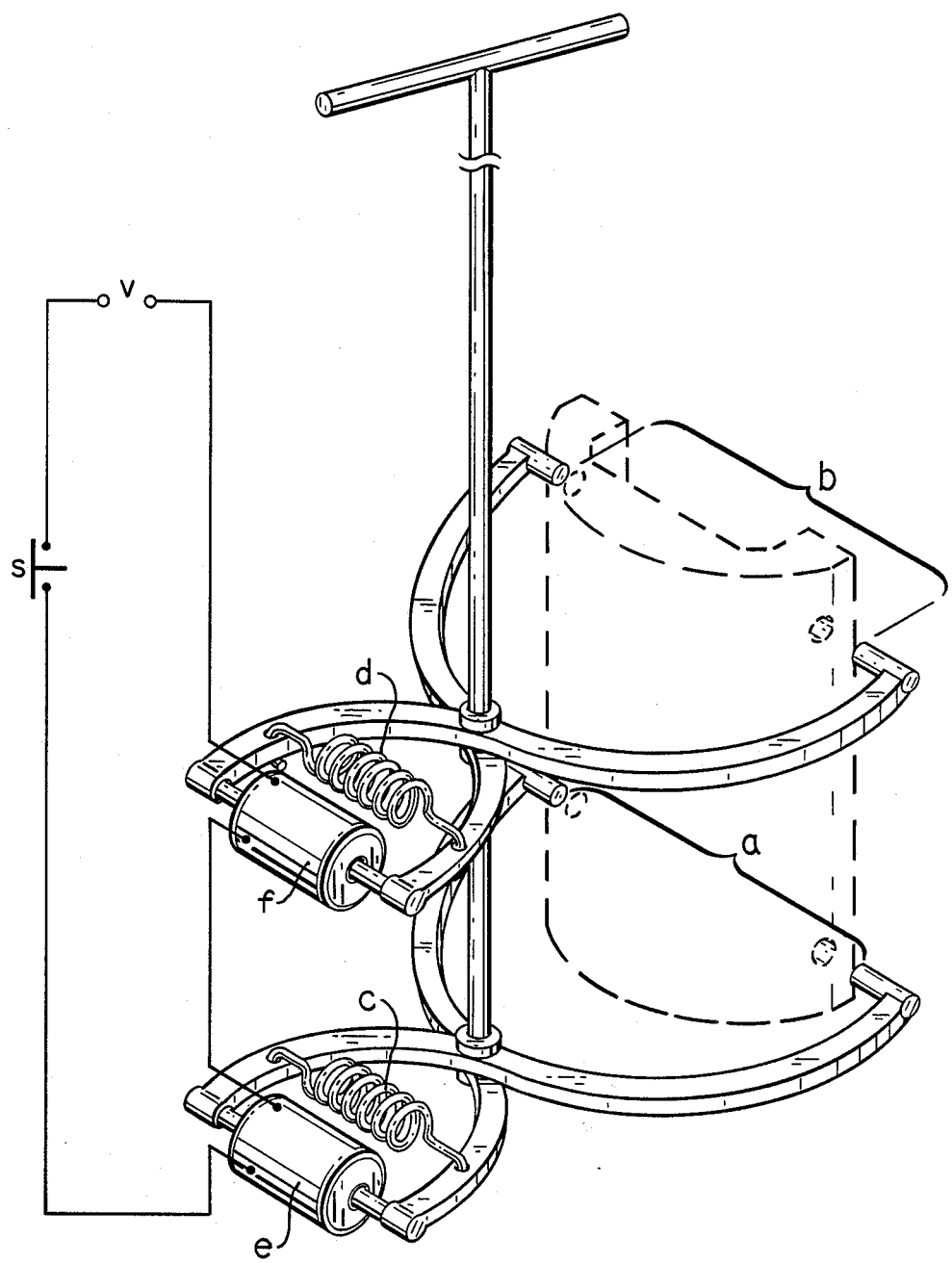

The quick-disconnect system allows a simple manipulator shown schematically in FIG. 3c to individually remove and replace damaged tiles 18. Each tile is U-shaped in cross section throughout its length, and has two transverse elongated elements, such as rods 21, inserted through bores 22 near the two end surfaces 23 of the arms of the U-shaped tile 18. (See FIG. 3b and FIG. 4.) A portion, or length, of each rod 21 is exposed between the parallel arms of the tile. Two fixed parallel runners 25 and 26 provided with L-shaped slots 27 (FIG. 3a) are attached to the chamber wall 11, such as by welding, over the full length of the rail limiter. The tiles 18 are then attached to the runners by forcing their associated rods 21 into the runner slots 27. (See FIG. 3a.) A single bar 28 sliding between the runners 25 and 26 has almost the same length as the associated rail limiter, and is provided with transverse grooves 29 spaced along the full length of the sliding bar 28 the same distances apart as the slots 27 in the runners 25 and 26.

To install the tiles 18, the sliding bar 28 is first positioned with its grooves 29 aligned with the openings of the slots 27 provided in the runners 25 and 26. Each tile 18, which weighs only about 4 lbs., for example, is grappled with a remote manipulator, such as that shown in FIG. 3c. It has two pair of tongs a and b held in a "closed" position as shown by springs c and d. The "closed" position is determined by stops on solenoids e and f, respectively. When the solenoids are energized electrically by closing a switch S, the solenoids force armatures out to open the ends of the respective tongs, thus separating the tongs sufficiently to fit over the bores 22 for the rods 21. By opening the switch S, the ends of the tongs are allowed to close into the bores 22 against the rods 21. (The rods may be hollow tubes to permit the ends of the tongs to enter their ends, and not just the bores 22 of the tile.) The manipulator may then be used to remove the tile or to place a new tile in the sliding bar grooves 29 and the aligned L-shaped slots 27 in the runners. Once the tile is in place, the switch S is again closed to open the tongs and remove the manipulator. The manipulator is inserted into or withdrawn from the chamber 12 through an open end, or a port (not shown) in the end.

When a tile 18 is installed over grooves 29 in the sliding bar 28 aligned with slots 27 in the runners 25 and 26, spring clips 30 (FIG. 6) retain the rods. The spring clips are in turn retained by screws 31. There is one spring clip 30 in each groove 29 extending the full width of the sliding bar 28. In that manner, a rod 21 of a tile 18 is retained in place after it is released by the manipulator, until the slide bar 28 is moved to the latching position shown in FIGS. 3a and 5.

When all of the tiles 18 have been installed on runners 25 and 26 for a given one of the rail limiters as described above, the tiles 18 are locked in place simultaneously by sliding the bar 29 a short distance in the direction of the downward arrow in FIG. 3a until the upper sides of the grooves 29 (as shown in FIG. 6) of the bar 28 push the rods 21 into retaining legs 27" of the runner slots 27 as shown in FIG. 3b. The runner slots have sloped surfaces or ramps in the retaining legs disposed at an angle of, for example, 4° to opposed surfaces at the back of the slots as indicated in FIG. 5, which force the tiles 18 back into contact with resilient conductive strips 32 (e.g., beryllium copper) against the chamber wall 11. This secures tiles 18 in place with good thermal and electrical conductance to the wall.

To replace any tile 18 of a rail limiter, the sliding bar 28 is pulled in the direction of the upward arrow in FIG. 3, unlocking all tiles 18 and freeing rods 21 from the runner slots 27 so the tiles 18 can be removed and replaced, one at a time, in any order, preferably by a suitable manipulator such as that shown in FIG. 3c, which allows manipulation from a remote position outside the chamber, although, before the vessel 10 becomes contaminated, it can be entered to replace the tiles by hand. Space allowance is made at both ends of a rail limiter (as shown in FIG. 3a) to accommodate the slight movement of the sliding bar 28 and associated tiles 18 during the latching and unlatching operations.

It should be noted that bar retaining tabs 33 shown in FIG. 3b on the runners 25 and 26 are spaced to hold the bar in place during normal unlatching of the tiles to replace one or more of them. To be able to easily remove the bar when all of the tiles have been removed, notches 34 are spaced along the length of the bar 28 so that by aligning the notches 34 with the tabs 33, the bar may be lifted out from between the runners by pulling it away from the wall. The clips 30 which extend the width of the bar may be used to engage the bar 28 by a suitable manipulator to accomplish this.

The rail limiter system described is sized to resist vibrations and electromagnetic loads placed on the system by disruptions of the plasma in the annular region of the chamber 10. During a full power D-T shot, for example, the limiter surface heat load of a model having four-foot limiters 14 and 16 was approximately one-half of the ohmic power deposited in the plasma (61 MJ in 15 sec) plus one-half of the alpha-particle power (102 MJ in 5 sec). A 10 mm plasma scrape-off length is assumed, resulting in a 5.8 MW/cm$^2$ peak power loading on the tiles. There is also volume heating in the limiters due to neutron and radiation ($\sim$22 W/cm$^2$ for 5 sec). Assuming that the heat load is uniform along all six sets of rail limiters, the maximum tile temperature rise will be about 1500° C. at the end of a 15 sec shot. The maximum tensile and compressive thermal stresses are slightly less than 40% of the respective ultimate strengths. The heat deposited on the limiters during the shot is first stored inertially in the tiles. It is then transferred by conduction to the chamber wall and carried away by a chamber coolant in channels 20 (FIG. 4) before the next shot. To improve thermal and electrical conductance between the tiles and wall, beryllium copper strips 32 are placed between the back side (interface) of the tiles 18 and the vessel wall. The tiles return to their initial temperature in about 15 minutes after each full power shot.

Although particular embodiments of the invention have been described and illustrated herein, it is recognized that modifications and variations may readily occur to those skilled in the art. Consequently, it is intended that the claims be interpreted to cover such modifications and variations.

What is claimed is:

1. In an apparatus for containing plasma in a high energy device having walls defining a plasma chamber, at least one rail limiter disposed on a wall within the plasma chamber, said rail limiter consisting of a plurality of discrete tiles arranged end on end, each tile having a uniform U-shaped cross section throughout its length with short parallel arms and two spaced-apart transverse rods inserted through bores in said parallel arms with a portion of each rod exposed between said parallel arms, and means for latching said discrete tiles on said wall comprising a pair of parallel runners affixed to said wall, said runners being spaced from one another sufficiently to just fit between said arms of said tiles, and means for releasably retaining said discrete tiles on said runners, said releasably retaining means comprising two L-shaped slots in each runner for each tile, each of said slots having a short leg perpendicular to the length of said runner for receiving a rod, and a long leg parallel to said wall, each long leg of every slot extending in the same direction for retaining a rod received by said short leg thereof, and a sliding bar between said runners having means for engagement with said rods in said slots to move said tiles in a direction for forcing said rods into said long legs of said slots.

2. Apparatus as defined in claim 1 wherein said sliding bar means for engagement with said rods in said slots comprises a separate transverse groove extending the width of said sliding bar for receiving each rod, and a spring clip in each groove for retaining each rod, whereby upon moving said sliding bar between said runners in the direction of said long legs of said slots parallel to said walls, each rod is forced to the end of a long leg of an associated one of said L-shaped slots for latching said rod in place, and thereby latching said tile in place.

3. Apparatus as defined in claim 2 wherein said long leg of each L-shaped slot of each U-shaped tile has a surface farthest from said wall sloped toward said wall from the entrance of said long leg to the closed end thereof, whereby said rod is forced toward said wall while being forced to the closed end of said long leg of each of said L-shaped slots to assure contact with said wall by said parallel arms of said U-shaped tile.

4. Apparatus as defined in claim 2 wherein said sliding bar extends very nearly the full length of said runners, said bar being slideably disposed between said runners and between said wall and said U-shaped tiles to be received and latched, further including taps spaced along said runners and extending over said sliding bar to retain said sliding bar while tiles are being received and latched, and notches in said bar, said notches being spaced along said bar equal to the spacing of said tabs on said runners for permitting said bar to be lifted out from between said runners while there is no U-shaped tile with a rod in any groove of said sliding bar.

5. Apparatus as defined in claim 3 further including a thin layer of resilient conductive material between the ends of said parallel arms of said U-shaped tiles and said wall, said material having relatively high thermal and electrical conductivity, whereby thermal contact between said tile and said wall is assured.

6. Apparatus for releasably retaining a column of U-shaped tiles on a wall comprising
   a pair of runners provided on said wall to which a discrete column of U-shaped tiles is to be retained, said runners being spaced from one another sufficiently to just fit between parallel arms of said U-shaped tiles, and having at least one separate pair of slots for each tile to be retained, one slot of a pair in each runner,
   a separate rod mounted in each tile through bores in said parallel arms of said U-shaped tile to be retained, each rod engaging a pair of slots in said runners, said slots being L-shaped to provide a receiving leg perpendicular to said wall and a retaining leg parallel to said wall, and
   a sliding bar having means for engaging said rod of each tile in said slots, said engaging means being comprised of a transverse groove for each rod to permit said receiving leg of each slot to receive a rod to the depth of said retaining leg, whereby sliding said bar in the direction of said retaining legs and parallel to said wall forces said rods into said retaining legs for latching said tiles in place.

7. Apparatus as defined in claim 6, wherein said retaining leg extending parallel to said wall has a surface farthest away from said wall sloped toward said wall in a direction away from said receiving leg, whereby said rod is forced toward said wall while being forced into said retaining leg to assure contact with said wall.

8. Apparatus as defined in claim 7 including strips of resilient material between said parallel sides of said U-shaped tiles and said wall to assure thermal contact therebetween.

9. Apparatus as defined in claim 7 including spring clips disposed in said transverse grooves of said sliding bar for releasably gripping said rods in in said slots until said rods are latched by sliding said bar in a direction away from receiving arms of said slots.

10. Apparatus as defined in claim 9 wherein each of said tiles includes two rods and said runners include two pair of slots, one pair for each of said two rods, said two pair of slots being spaced a distance equal to said rods in said tiles.

* * * * *